Patented Jan. 31, 1939

2,145,625

UNITED STATES PATENT OFFICE 2,145,625

FIREPROOF BRONZE WELDED STRUCTURE

Augustus B. Kinzel, Douglaston, N. Y., assignor to Electro Metallurgical Company, a corporation of West Virginia No Drawing. Application April 22, 1937,
Serial No. 138,374

3 Claims. (Cl. 219—8)

This invention relates to welding and more particularly to bronze welding of fire resistant structures.

When ordinary gas and electric arc welding methods are applied to structural work, steel-frame buildings for example, the high temperatures necessarily attained in the contiguous edges of the structures to be joined produce undesirable effects which require correction. Since steel and iron are relatively good conductors of heat, the plates are highly heated to a considerable distance from the weld, and this condition is likely to result in distortion and stresses in the plates.

By the use of a non-ferrous weld metal of lower melting point than the steels ordinarily used for the weld filler material, less heat is required and, as a consequence, there is less likelihood of an undesirable distortion in the plates. Furthermore, by the use of a sufficiently large quantity of weld metal which has the property of distorting or yielding at lower unit loads than steel and which has sufficient plasticity to absorb strains set up in the welding process, such stresses as may be set up at the lower welding temperatures employed will be substantially transferred to and absorbed by the weld metal.

The bronze welding method, however, introduces difficulties. Bronze welded steel structures usually have low strength at moderately elevated temperatures and the intergranular penetration of copper into the steel reduces the fatigue strength of the latter. It is an object of this invention to provide a bronze welded steel structure free from the disadvantages described above.

I have discovered that a structure which is fire resistant, and does not suffer from reduced fatigue strength caused by intergranular penetration of copper into steel, may be fabricated by ordinary bronze-welding, provided there is used a welding rod which has the desired flowing characteristics produces a deposit having the requisite high temperature strength, and which does not produce intergranular penetration into steel during the welding operation. Investigation has shown that a welding rod which possesses these characteristics comprises substantially 20% to 25% nickel, 13% to 19% zinc, up to 0.5% silicon, and the remainder copper. A weld made with a rod containing 25% nickel, 15% zinc, 0.25% silicon, remainder copper, when tested, had the following physical properties:

Yield point_____pounds per sq. inch__ 36,000
Ultimate strength_____do____ 60,000
Elongation in tensile test—
                  per cent in one inch__ 14
Bend elongation_____do____ 60
Transverse shear strength—
              pounds per linear inch__ 14,400

Welding rods of this composition, and welds made therewith, withstood tensile loads of 18,000 pounds per square inch at temperatures up to 1,000° F. for periods of ten hours, and are therefore "fire-resistant" according to the definitions ordinarily applied to structural steel.

Without departing from the invention, the nickel may be partly replaced by cobalt. Moreover, if the highest fatigue strength is not an important consideration in the structure in question, the relatively large percentage of nickel may be replaced by a relatively small percentage of one or more elements for instance beryllium, which impart the desired strength at elevated temperatures at least as high as 1000° F., and which impart a strength that persists for a least 18 hours at 900° or 1000° F.

I claim:

1. Fire-resistant structure comprising at least two steel members bonded with weld filler material containing substantially 20% to 25% nickel, 13% to 19% zinc, silicon in an amount not over 0.5%, and the remainder copper; said structure having, across said bond, a tensile strength at least 18,000 pounds per square inch at 1000° F., which strength persists for at least 18 hours at said temperature.

2. A fire-resistant structure which comprises at least two steel members bonded with weld filler material containing approximately 25% nickel, 15% zinc, silicon in an amount not over 0.5% and the remainder copper; said structure having, across said bond, a tensile strength at least 18,000 pounds per square inch at 1000° F., which strength persists for at least 18 hours at said temperatures.

3. Welding rod for use in producing welded joints having high strength at elevated temperatures, which rod has approximately the composition: 25% nickel, 15% zinc, 0.25% silicon, and the remainder copper.

AUGUSTUS B. KINZEL.